US009078020B2

(12) United States Patent
Buehl et al.

(10) Patent No.: US 9,078,020 B2
(45) Date of Patent: Jul. 7, 2015

(54) DYNAMIC OPTIMIZATION OF VIDEO CONTENT DISTRIBUTION

(71) Applicant: Hulu, LLC, Santa Monica, CA (US)

(72) Inventors: Eric Buehl, Studio City, CA (US);
Richard Tom, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 374 days.

(21) Appl. No.: 13/624,159

(22) Filed: Sep. 21, 2012

(65) Prior Publication Data
US 2014/0089998 A1    Mar. 27, 2014

(51) Int. Cl.
*H04N 21/25* (2011.01)
*H04N 21/231* (2011.01)
*H04N 21/2343* (2011.01)

(52) U.S. Cl.
CPC ......... *H04N 21/25* (2013.01); *H04N 21/23113* (2013.01); *H04N 21/23439* (2013.01)

(58) Field of Classification Search
None
See application file for complete search history.

(56) References Cited

U.S. PATENT DOCUMENTS

| 7,895,445 | B1* | 2/2011 | Albanese et al. ............. 713/185 |
| 2002/0059573 | A1* | 5/2002 | Nishio et al. ...................... 725/1 |
| 2004/0226045 | A1* | 11/2004 | Nadarajah ........................ 725/97 |
| 2006/0168632 | A1* | 7/2006 | Honda et al. ................... 725/95 |
| 2012/0297410 | A1* | 11/2012 | Lohmar et al. ................. 725/14 |

\* cited by examiner

*Primary Examiner* — Mark D Featherstone
(74) *Attorney, Agent, or Firm* — Brian N. Young; Fountainhead Law Group PC

(57) ABSTRACT

In one embodiment, a method distributes files for assets to a plurality of content delivery networks (CDNs). The method determines a set of asset characteristics related to an asset of video content and analyzes the set of asset characteristics to determine a delivery classification for the asset. Different asset characteristics result in different delivery classifications. The method then automatically determines a set of content delivery networks to distribute files for the asset based on the delivery classification where assets with different delivery classifications have files delivered differently to sets of content delivery networks.

23 Claims, 7 Drawing Sheets

DYNAMIC OPTIMIZATION OF VIDEO CONTENT DISTRIBUTION

BACKGROUND

Companies may use content delivery networks (CDNs) when delivering video content. CDNs are networks of computers and the CDNs replicate content such that the content may be geographically located near users that are requesting the content, which improves the delivery of the content to the users. If a company wants to use one of these CDN network providers, the company needs to provide the network provider with a file of the video content. Also, when the company wants the CDN to deliver multiple bitrates of the content, the company needs to deliver a file for each bitrates. Due to the small scale that most companies operate in delivering video to users (i.e., the demand is not large enough to overwhelm a single CDN), a company may leverage only a single CDN network provider to deliver the company's content. In this case, the company sends every video that is received to the single CDN network provider.

In some cases, a company may deliver a very large scale of content to users. This scale requires the company to use multiple CDNs to ensure that user experience is acceptable. For example, the company may want to add redundancy over multiple CDNs. The CDN network providers operate independently. Thus, due to the CDNs being independent, the company must then provide each CDN network provider a copy of the content. For example, when the company receives a new video, the company automatically distributes one or more files for the video to all of the associated CDN network providers.

CDN network providers often charge for the delivery service based on the bandwidth required to deliver the files and also for storage to store the files on the CDN. Thus, a company may be charged by multiple CDNs for both the bandwidth and storage. As the number of videos a company delivers increases, costs for bandwidth and storage increase immensely. For example, the company still pays for bandwidth and storage for existing videos while adding new costs for new videos that are added. To avoid the cost of using some CDNs, companies may build out their own CDN. However, a company still incurs costs associated with bandwidth and storage when operating its own CDN.

SUMMARY

In one embodiment, a method distributes files for assets to a plurality of content delivery networks (CDNs). The method determines a set of asset characteristics related to an asset of video content and analyzes the set of asset characteristics to determine a delivery classification for the asset. Different asset characteristics result in different delivery classifications. The method then automatically determines a set of content delivery networks to distribute files for the asset based on the delivery classification where assets with different delivery classifications have files delivered differently to sets of content delivery networks.

In one embodiment, a non-transitory computer-readable storage medium is provided that contains instructions for distributing files for assets to a plurality of content delivery networks (CDNs), wherein the instructions, when executed, control a computer system to be configured for: determining a set of asset characteristics related to an asset of video content; analyzing the set of asset characteristics to determine a delivery classification for the asset, wherein different asset characteristics result in different delivery classifications; and automatically determining a set of content delivery networks to distribute files for the asset based on the delivery classification, wherein assets with different delivery classifications have files delivered differently to sets of content delivery networks.

In one embodiment, an apparatus is provided that is configured to distribute files for assets to a plurality of content delivery networks (CDNs), the apparatus comprising: one or more computer processors; and a non-transitory computer-readable storage medium comprising instructions, that when executed, control the one or more computer processors to be configured for: determining a set of asset characteristics related to an asset of video content; analyzing the set of asset characteristics to determine a delivery classification for the asset, wherein different asset characteristics result in different delivery classifications; and automatically determining a set of content delivery networks to distribute files for the asset based on the delivery classification, wherein assets with different delivery classifications have files delivered differently to sets of content delivery networks.

The following detailed description and accompanying drawings provide a better understanding of the nature and advantages of particular embodiments.

DETAILED DESCRIPTION

Described herein are techniques for a video content distribution system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
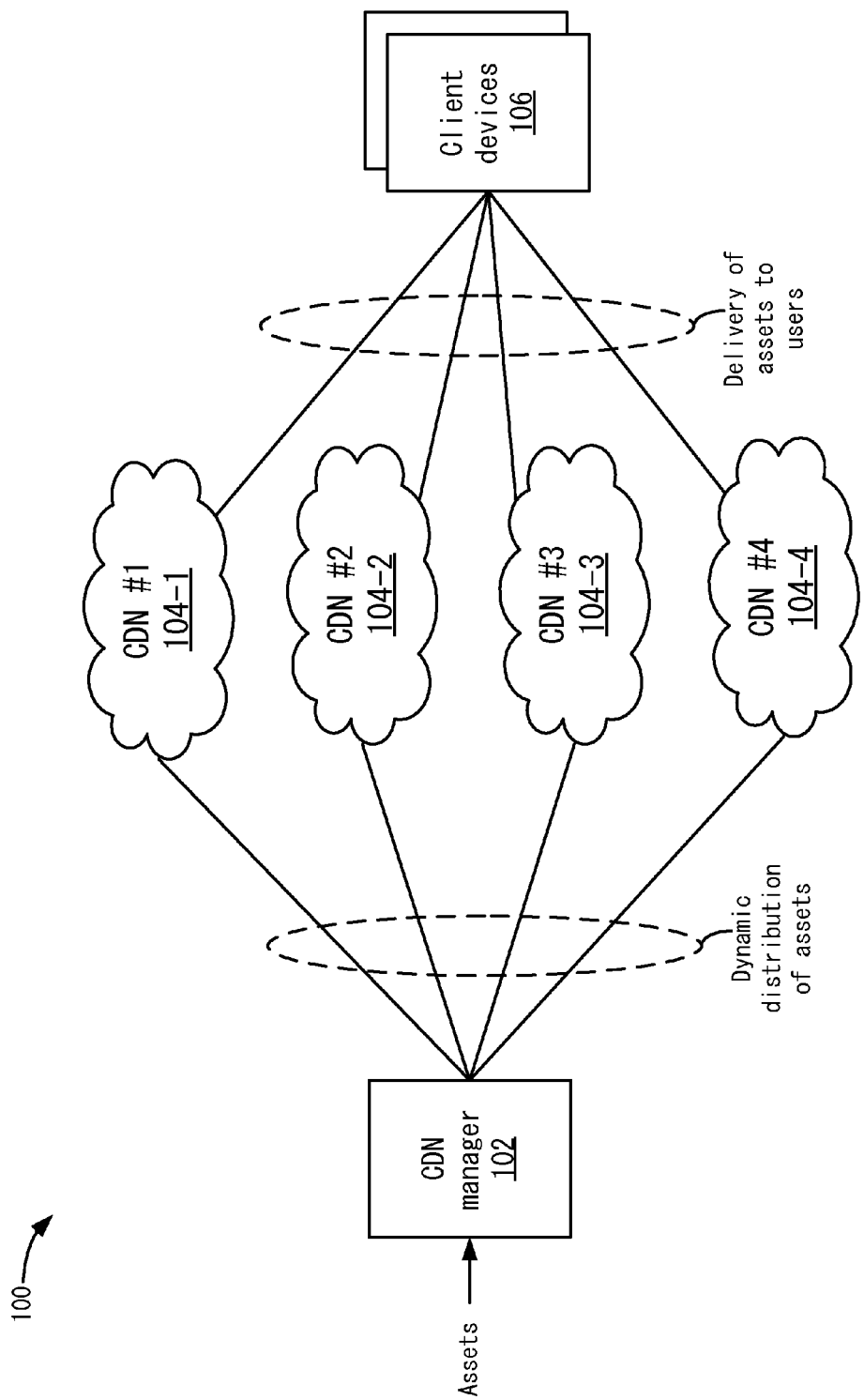
FIG. 1 depicts a simplified system for distributing video content according to one embodiment.

FIG. 1 depicts a simplified system 100 for distributing video content according to one embodiment. System 100 includes a content delivery network (CDN) manager 102 and a plurality of content delivery networks (CDNs #1-4) 104-1-104-4. CDN manager 102 may be associated with a service that provides video content to users. For example, a company delivers television episodes, motion pictures, and other content produced as primary content of interest to users. Although video content is described, other forms of content may be appreciated, such as audio. The company leverages CDNs 104 in providing the content to the users through streaming or other delivery technologies to client devices 106.

Each CDN 104 may be associated with a different network provider. The network provider may be a different entity from the company providing the service or may be a CDN owned by the company. For example, CDN #1 is associated with a first network provider; CDN #2 is associated with a second network provider, CDN #3 is associated with a third network provider, and CDN #4 is associated with the company providing the delivery service. Each CDN 104 requires a file for the video content to deliver the video to users. Although each CDN 104 is described as being associated with a different network provider, CDNs 104 may be associated with the same network provider. However, the company may operate the CDNs separately where each CDN would require a file for the video content.

CDN manager 102 receives an asset of video content. The asset is a specific piece of video content, such as a television show, movie, or video clip. Once receiving the asset, files for the asset need to be distributed to different CDNs 104. For example, the asset may be transcoded into files for different bitrates and the files are distributed to CDNs 104.

CDN manager 102 dynamically determines which CDNs 104 to distribute files for the asset. CDN manager 102 distributes the files for the asset to optimize cost and performance. As discussed above, a company may incur cost for bandwidth and storage. Although a company may want to reduce costs for bandwidth and storage, the company also wants to provide users with a good user experience, which may be having the video readily available and in a size that can be downloaded by different clients and also on a sufficient number of CDNs 104 such that the video can be delivered in an acceptable time. This requires that the company distribute files for assets to enough CDNs 104 such that the CDNs 104 can deliver the video reliably. Also, the company may deliver different bitrates of the video to CDNs 104 to allow the CDNs 104 the option of delivering videos of different quality to users. Particular embodiments balance these requirements in distributing files for assets to CDNs 104.

In dynamically determining CDNs 104, CDN manager 102 analyzes asset characteristics where different asset characteristics cause different assets to be dynamically distributed to different sets of CDNs 104. In one embodiment, the asset characteristics include popularity and the size of the file. Popularity may be measured based on different metrics, such as revenue, number of views or requests, etc. The size of the file may be the resolution of the video where higher resolution files are larger than lower resolution files. Other asset characteristics may also be appreciated.

Depending on the asset characteristics, files for the asset may be distributed to different CDNs 104 to minimize the cost of storage while maintaining performance for delivering the files to users. For example, redundancy, high availability (HA), and quality of service are maintained by analyzing the asset characteristics to determine how to cost effectively distribute files for the asset. In a simple example, files for a first asset are delivered to CDNs #1 and #2 and files for a second asset are delivered to CDNs #1-4. The company may consider the second asset more popular and thus distributes the files for the asset to more CDNs 104 than the first asset to maximize performance. However, to save storage cost, the company delivers the less popular first asset to fewer CDNs 104. This saves cost with respect to storage while also maintaining performance because users may request the first asset less. Other scenarios for distributing files for assets will be discussed below.

Figure 2:
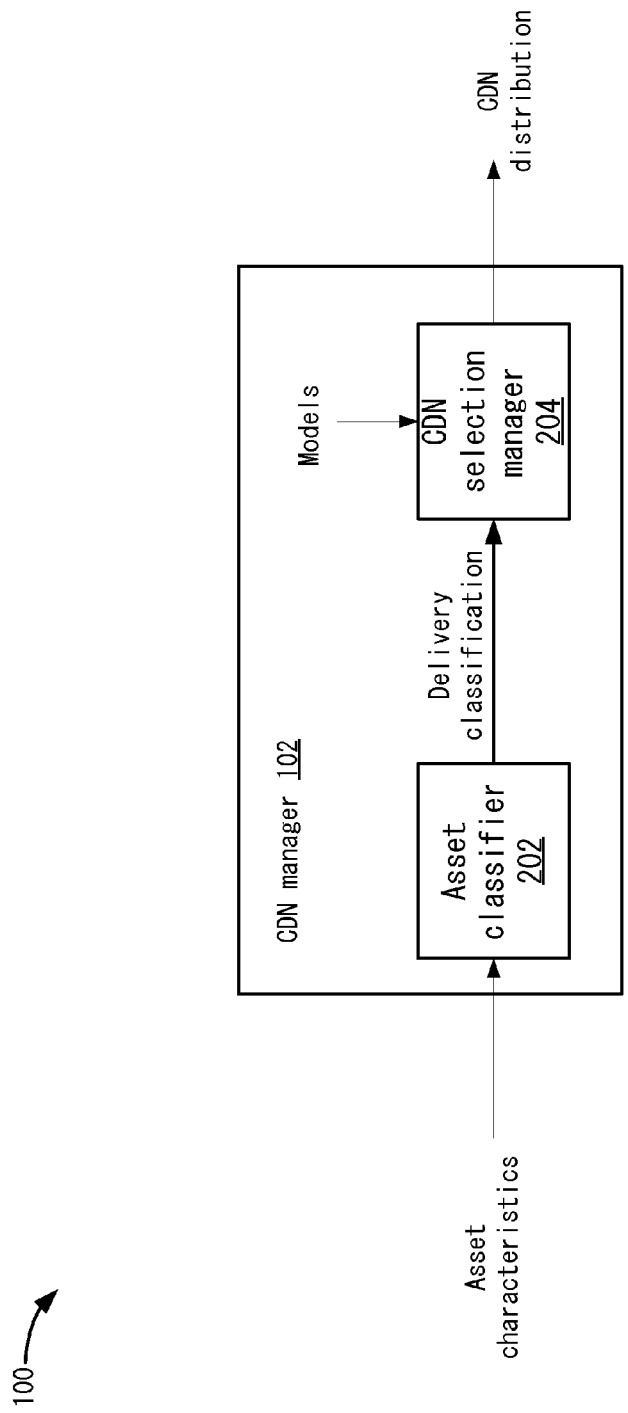
FIG. 2 depicts a more detailed example of a CDN manager according to one embodiment.

FIG. 2 depicts a more detailed example of CDN manager 102 according to one embodiment. An asset classifier 202 receives asset characteristics. The asset characteristics are associated with an asset that a company receives and wants to distribute to CDNs 104. Also, the asset characteristics may be for an asset that has already been distributed to CDNs 104 in which case the company may dynamically adjust the distribution. For example, the asset characteristics may change over time and CDN manager 102 continually analyzes the asset characteristics to dynamically determine if the distribution should be adjusted. In one example, the asset characteristics may include a popularity of the asset. The popularity may be predicted from historical data, such as the popularity of a previous episode of a series may be interpolated to determine the popularity of the present episode. Additionally, the popularity of a movie may be determined based on how popular the movie was when released in the theaters. These metrics may predict the number of views for the asset. Popularity may also be predicted using revenue metrics. Revenue metrics may predict from historical data how much revenue the asset may generate. For example, an asset that may be popular and downloaded a large amount of times may generate more revenue. If historically, a movie was successful in theatres or the prior episodes of a series were popular, then the revenue metrics are predicted to be higher. Another asset characteristic may be the size of the file. For example, if the file size of the asset is larger, then additional cost may be incurred because a larger size file needs to be distributed to CDNs 104 and also stored. Other metrics associated with the asset may also be appreciated.

Asset classifier 202 analyzes the asset characteristics to determine a delivery classification. For example, depending on how the cost and performance should be optimized, asset classifier 202 determines different delivery classifications. In one embodiment, the delivery classification classifies each asset into a category. For example, categories include "popular" for videos that are requested often, "less-viewed" for assets that are expected to be requested less often, "long-tail" for videos that have been released for a longer period of time, "file size" for different bitrates, and other categories that will be described in more detail below.

Depending on the delivery classification, CDN manager 102 may distribute files for the asset differently. In one example, CDN selection manager 204 uses different models to determine the CDN distribution. The different models may have different goals for optimization. For example, a first model may optimize for storage cost based on multiple bitrates while maintaining redundancy, a second model may optimize for performance and storage cost, and a third model may optimize for minimum redundancy and storage cost. Although these models are described, other models may also be appreciated.

In one embodiment, CDN selection manager 204 may change models based on which asset is being distributed. In other examples, the model may be changed based on a company's preference. For example, a company may want to optimize performance and storage cost for a certain time period or for a set of assets.

Figure 3:
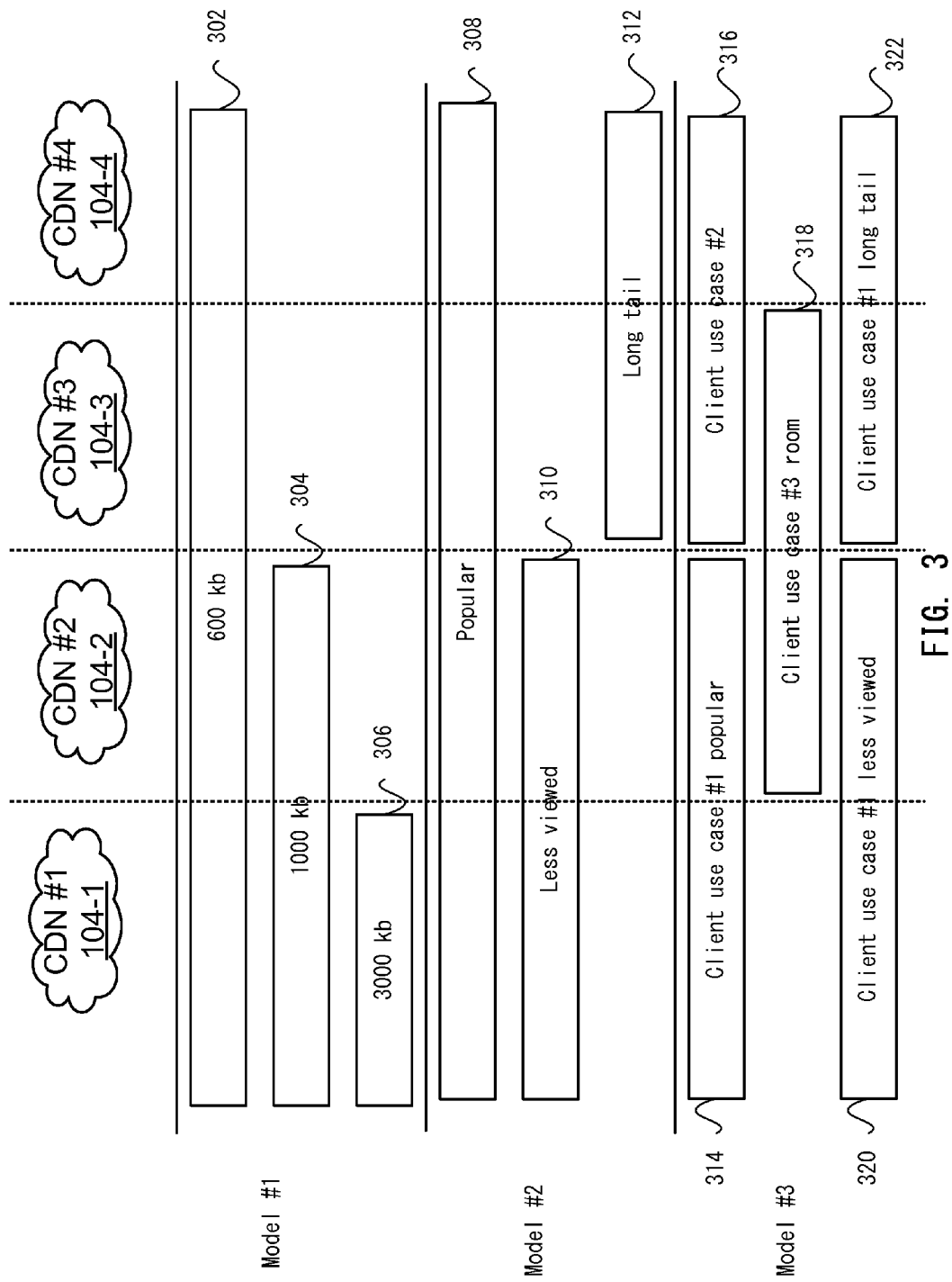
FIG. 3 shows three models and the possible distribution of files for assets according to one embodiment.

FIG. 3 shows three models and the possible distribution of files for assets according to one embodiment. Three models #1-3 and CDNs #1-4 are shown. In model #1, the configuration optimizes for storage cost when multiple bitrates for an asset are available while maintaining redundancy. This model identifies a minimum set of files that will provide acceptable playback for users. That is, model #1 hopes to provide a file of a size that can be played acceptably by most media players and also files of sizes that provide higher quality for media players that can stream video at higher bandwidths. As is known, higher bitrates provide video that is of a higher quality, but have a file size that is larger and thus more expensive to store and also more expensive to deliver to a user. In FIG. 3, the files sizes of 600 kb, 1000 kb, and 3000 kb are shown at 302, 304, and 306, respectively, and represent low, medium, and high bitrates, respectively.

In one embodiment, model #1 provides a low bitrate file (e.g., 600 kb) that is of a size that may allow all media players used by users to be able to play the video in an acceptable manner. To maximize redundancy, CDN selection manager 204 distributes the 600 kb file to CDNs #1-4 as shown at 302. While cost is incurred to store the 600 kb files at all four CDNs, the cost is lower than storing higher bitrate files because the size of the 600 kb file is smaller. However, performance is maximized because all four CDNs have a copy of the file and can be used to deliver the video to users.

Higher bitrate files are distributed to a fewer number of CDNs than the lowest bitrate file. For example, at 304, the 1000 kb file is distributed to CDNs #1 and #2. Also, at 306, the 3000 kb file is distributed to an even fewer number of CDNs, such as CDN #1. By distributing the higher bitrate files to a fewer number of CDNs, redundancy is reduced; however, cost savings is maximized because the larger files are stored on fewer CDNs. Also, by providing the lowest bitrate files to all CDNs, model #1 provides sufficient redundancy.

In model #1, the delivery classification may classify the asset by the available bitrates. For example, CDN selection manager 204 may determine that the 600 kb file is available for a less popular show and that the 600 kb, 1000 kb, and 3000 kb files are available for more popular shows.

Additionally, model #1 may use other characteristics in distributing files for assets. For example, assets are separated based on content metadata. In one example, if a television series is being distributed, then the highest bitrate files for series #1 may be distributed to CDN #1 and the highest bitrate files for series #2 may be distributed to CDN #2. Thus, an outage at CDN #1 would only affect the highest bitrate files for series #1, and not series #2.

For model #2, the delivery classifications may be "popular", "less-viewed", and "long-tail". As discussed above, a popular video may be one in which a company expects that there will be a higher number of requests for the video once released and the company expects a less popular video will be viewed by a lower number of users. Also, a long-tail video may be a video that has been released previously and has been available for a certain period of time (e.g., greater than 6 months). The long-tail video may have its popularity stabilize after an initial period.

Model #2 optimizes for performance and cost. In this case, an asset that is classified as popular is distributed across all possible CDNs. For example, at 308, CDN selection manager 204 distributes the popular asset to CDNs #1-4. Additionally, CDN selection manager 204 may distribute files for all available bitrates for the popular asset. This optimizes performance for the popular asset all CDNs can deliver the video to users in a variety of bitrates.

At 310, CDN selection manager 204 distributes videos classified as less-viewed to fewer CDNs, such as CDNs #1-2. In this case, the company expects less-viewed videos to be requested less and thus does not need to distribute the video to all CDNs 104. For example, as content becomes less popular, requests for the video decrease. In this case, if an asset was previously classified as popular (and had files distributed to all CDNs), files may be deleted from a subset of CDNs (e.g., files are deleted from CDNs #3-4). This may reduce storage costs for that asset. Conversely, if content becomes more popular, such as a less-viewed video is re-classified as a popular video, files for the less viewed video may be added to additional CDNs 104.

At 312, if asset classifier 202 classifies a video as long-tail, then CDN selection manager 204 distributes files for the asset to fewer CDNs, such as CDNs #3-4. Also, CDN selection manager 204 may distribute the long-tail files to different CDNs 104 from the less viewed files to spread videos evenly over CDNs 104. For long tail videos, as time has passed, views for the videos have stabilized and thus files for the video are stored on fewer CDNs than a popular video. This also reduces storage costs.

Model #2 reduces storage and bandwidth costs by minimizing the number of CDNs 104 used unless the asset is considered popular. Since the most popular content may use the majority of the CDN bandwidth, spreading the bandwidth used among the most CDNs 104 gives the best chance to maximize end-user quality of service (QoS). As the popular content views decrease, the removal of files from CDNs 104 reduces storage costs but also maintains the redundancy and QoS requirements.

Model #3 optimizes for minimum redundancy and storage cost. For example, this model minimizes duplication of files for assets across CDNs #1-4. In this case, asset classifier 202 uses the popularity of the asset and also how client devices 106 receive the asset (or the device destination) to determine the delivery classification. The device destination may be where/how the asset may be delivered, such as through the web, to a mobile device, or to a living room device. The different scenarios will be referred to as client use cases. In one example, files for an asset may be stored on at most two CDNs 104. This assures some redundancy but also reduces the storage cost.

At 314, if asset classifier 202 classifies the asset as "client use case #1, popular", the asset is delivered to CDNs #1 and #2. For example, client use case #1 includes client device 106 receiving the asset through the Internet ("the web"). At 316, CDN selection manager 204 distributes an asset classified as "client use case #1" to CDNs #3 and #4. For example, client use case #2 includes client device 106 receiving the asset through a mobile network. At 318, 320, and 322, if asset classifier 202 classifies the asset as "client use case #3", client use case #1 less-viewed", and "client use case #1 long-tail", respectively, CDN selection manager 204 distributes files to the asset to CDNs #2 and #3, CDNs #1 and #2, and CDNs #3 and #4, respectively. Client use case #3 includes client device 106 receiving the asset when client device 106 is a set top box or other device commonly referred to as a "living room" device. Also, the classifications less-viewed and long-tail are determined based on the popularity and length of time the asset has been released. Accordingly, model #3 limits the distribution of files for assets to minimize cost.

Figure 4:
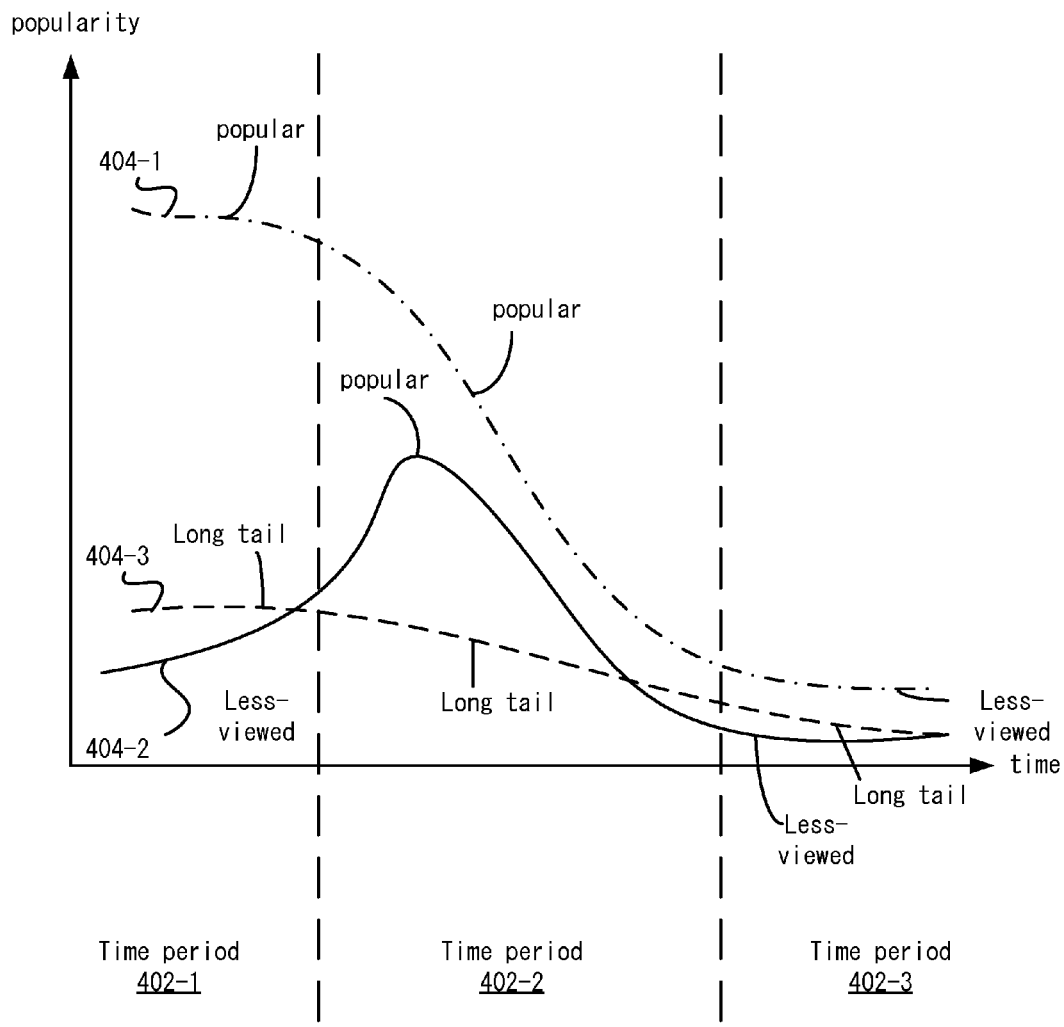
FIG. 4 depicts a graph showing the popularity for different assets over time according to one embodiment.

As was discussed above, CDN manager 102 may dynamically change the distribution of files for assets. For example, as the popularity changes for an asset, CDN manager 102 may dynamically change the distribution files no matter which model is being used. Dynamically changing the distribution allows a company to reduce costs if an asset becomes less popular, but also allows the company to increase redundancy if an asset becomes more popular. FIG. 4 depicts a graph showing the popularity for different assets over time according to one embodiment. The graph shows three sections that represent three time periods 404-1-404-3. At each time period, CDN manager 102 may automatically classify an asset and distribute files for the asset to different CDNs 104. CDN manager 102 may then dynamically adjust the distribution depending on any changes in the delivery classification that occur based on the popularity. Although three time periods are described, it will be understood that CDN manager 102 may perform the re-classification at any time. Also, although popularity is discussed, CDN manager 102 may use other metrics to adjust the distribution.

In a first time period 402-1, CDN manager 102 needs to distribute three assets to CDNs #1-4. In this example, a first popularity curve 404-1 is shown for a first asset, a second popularity curve 404-2 is shown for a second asset, and a third popularity curve 404-3 is shown for a third asset. CDN manager 102 classifies the assets based on model #2; however, CDN manager 102 may use other models.

CDN manager 102 classifies the first asset as "popular" because popularity curve 404-1 shows the popularity of this asset to be high (e.g., the popularity is above a threshold). The second asset is classified as "less-viewed" because popularity curve 404-2 indicates the popularity of this asset is low. The third asset is classified as "long-tail" because the asset has been released previously and the popularity is low. In first time period 402-1, CDN manager 102 distributes the first asset to CDNs #1-4, distributes the second asset to CDNs #1-2, and distributes the third asset to CDNs #3-4.

In a second time period 402-2, CDN manager 102 dynamically evaluates the delivery classifications for the assets. The first asset and the third asset have the same classification. For example, although the popularity of the first asset has waned slightly, the popularity is still high. Also, the popularity for the third asset remains relatively unchanged. Thus, CDN manager 102 keeps the first asset as a popular asset and the third asset as a long tail asset. However, the popularity for the second asset has increased during the second time period. In this case, CDN manager 102 reclassifies the second asset as "popular" and CDN manager 102 needs to dynamically adjust the distribution of files for the second asset. For example, because the second asset is more popular, a company may want to distribute files for the asset to the maximum number of CDNs 104. Thus, CDN manager 102 may distribute files for the second asset to CDNs #3 and #4, which increases the distribution of files for the second asset from CDNs #1-2 to CDNs #1-4. Additionally, if all bitrates for the files have not been distributed to CDNs #1-4, CDN manager 102 may distribute additional bitrates for the asset to appropriate CDNs #1-4.

In a third time period 402-3, the popularity of all three videos has decreased. This may be expected because, over time, users typically view videos less often. In this case, CDN manager 102 has reclassified the first and second assets as "less viewed". In this case, files for the first asset and the second asset are removed from CDNs #3 and #4. Additionally, higher bitrate files may be removed from CDNs #3 and #4. It should be noted that if an asset was distributed to CDNs #3 and 4, but the re-classification caused the distribution to be CDNs #1 and #2, CDN manager 102 may not transfer the asset from CDNs #3 and #4 to CDNs #1 and #2. Because the asset is distributed to the same number of CDNs, transferring the asset would incur transfer charges, but would not materially affect the performance or cost.

Figure 5:
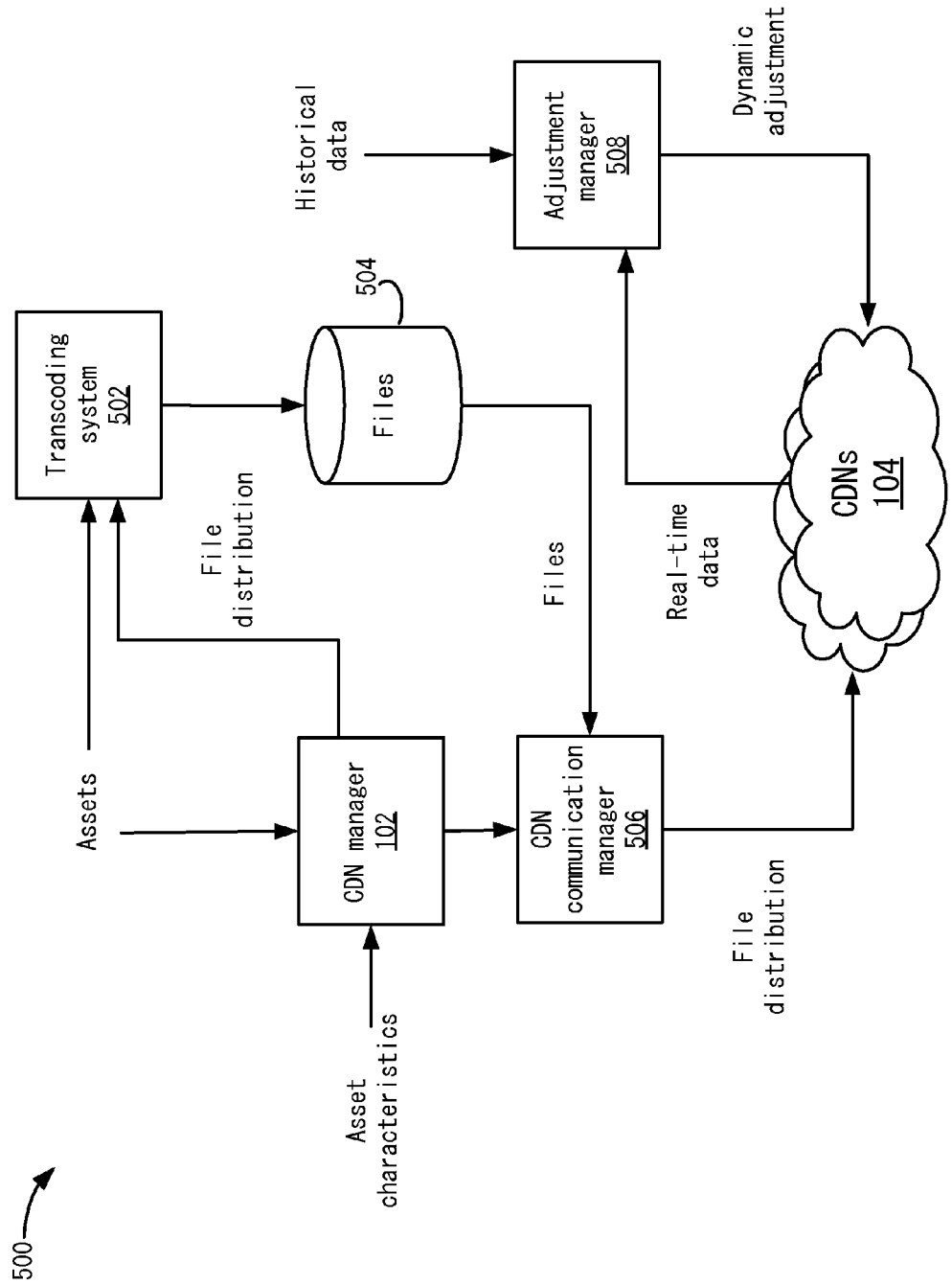
FIG. 5 depicts a simplified system for automatic distribution and adjustment of files stored on CDNs according to one embodiment.

Using particular embodiments, a company may automatically control the distribution of files for assets and use historical and/or real-time data to dynamically adjust the distribution. FIG. 5 depicts a simplified system 500 for automatic distribution and adjustment of files stored on CDNs 104 according to one embodiment. CDN manger 102 determines assets to distribute and determines which files for the assets to distribute to which CDNs 104 as described above.

An asset may be received in a file that is at a single bitrate (e.g., a high definition file). Because multiple bitrates for the asset may be needed, a transcoding system 502 is used to transcode the file into multiple bitrates. In one embodiment, transcoding system 502 may automatically transcode assets into desired bitrates. For example, CDN manager 102 may communicate with transcoding system 502 to indicate which bitrates are desired based on the asset characteristics. Transcoding system 502 thus only transcodes the needed bitrates. In other examples, transcoding system 502 may transcode the assets into different bitrates based on other factors, such as a user may set which bitrates to transcode an asset into or transcoding system 502 may automatically transcode the file into a standard number of bitrates. This may result in assets being transcoded into bitrates that may not be distributed to CDNs 104, however. For example, if CDN manager 102 determines an asset will not be popular, CDN manager 102 may not distribute the highest bitrates to any CDNs 104. After transcoding, transcoding system 502 then stores the files in storage 504.

When CDN manager 102 determines which files need to be distributed to CDNs 104, CDN manager 102 sends a message to a file communication manager 506 indicating which files should be distributed to which CDNs 104. File communication manager 506 retrieves the files from storage 504 and sends the files to the appropriate CDNs 104. The above transcoding and distribution of files may be performed automatically. This allows intelligent distribution of files for assets to different sets of CDNs to optimize cost and storage without requiring user intervention.

Particular embodiments may dynamically adjust the distribution of files without user intervention also. An adjustment manager 508 monitors data related to the distribution of the files, such as historical data and real-time data. The historical data may be a popularity curve that was determined based on prior viewing data, such as for previous episodes. The real-time data may be determined based on views of files for the asset. For example, the company releases an episode and the views of the episode are monitored. In one embodiment, CDNs 104 may send the real-time data to adjustment manager 508.

Adjustment manager 508 analyzes the data to determine when changes in the file distribution should be made. For example, as discussed above, as the popularity of an asset wanes, files may be removed from some CDNs 104 to lower the storage cost. In this case, adjustment manager 508 may send a message to some of the CDNs 104 to remove files for an asset. In another example, if the popularity increases for an asset, adjustment manager 508 may retrieve files from storage 504 and distribute the files to additional CDNs 104. For example, real-time data may indicate that users are requesting a file more than expected and thus, adjustment manager 508 distributes files to additional CDNs 104. Accordingly, adjustment manager 508 allows the automatic adjustment of file distribution that optimizes the distribution for an asset over the lifetime of the asset.

Figure 6:
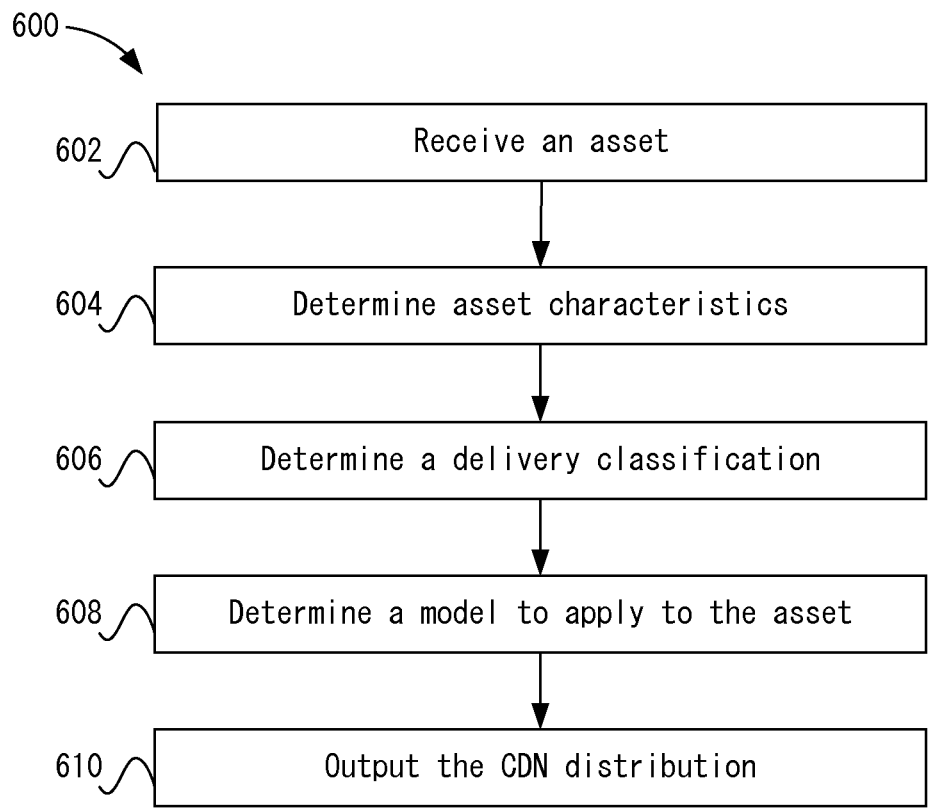
FIG. 6 depicts a simplified flowchart of a method for distributing files for an asset according to one embodiment.

The following will now describe general method flows. Variations of the method flows may be appreciated depending on the different models used. FIG. 6 depicts a simplified flowchart 600 of a method for distributing files for an asset according to one embodiment. At 602, CDN manager 102 receives an asset. At 604, CDN manager 102 determines asset characteristics. As discussed above, the asset characteristics may include popularity and size metrics.

At 606, CDN manager 102 determines a delivery classification. For example, the delivery classification may categorize the asset in a variety of categories. At 608, CDN manager 102 determines a model to apply to the asset. For example, different models may be used to distribute files to CDNs 104. In one example, each model may have different goals and CDN manager 102 may select a model to use. CDN manager 102 may select the model based on asset characteristics or a company may set the model to use. At 610, CDN manager 102 outputs the CDN distribution. In this case, CDN manager 102 may determine which files should be distributed to which CDNs 104.

Figure 7:
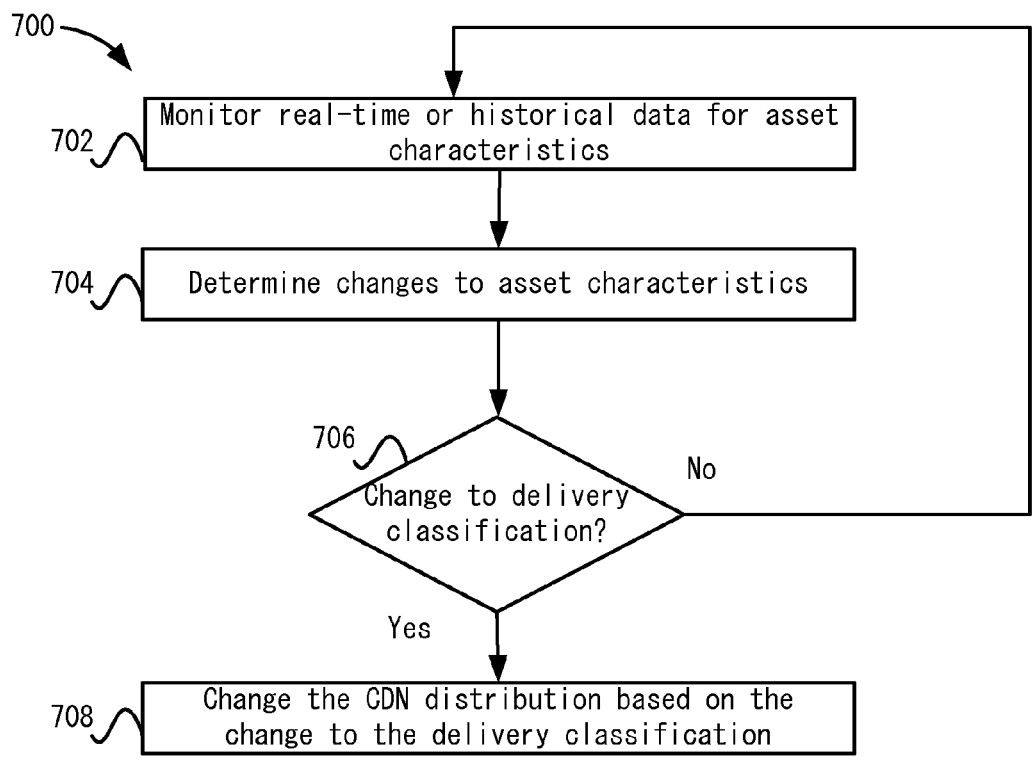
FIG. 7 depicts a simplified flowchart of a method for dynamically adjusting the CDN distribution according to one embodiment.

After determining the initial distribution of files to CDNs, CDN manager 102 may monitor the distribution to dynamically change the distribution. FIG. 7 depicts a simplified flowchart 700 of a method for dynamically adjusting the CDN distribution according to one embodiment. At 702, CDN manager 102 monitors real-time or historical data for asset characteristics. For example, CDN manager 102 may monitor the popularity of an asset. In other examples, the real-time popularity may not be monitored, but CDN manager 102 monitors a predicted popularly. For example, historical data may be used to predict the popularity curve for an asset.

At 704, CDN manager 102 determines changes to asset characteristics. For example, CDN manager 102 determines that a change in popularity has occurred.

At 706, CDN manager 102 determines if a change to the delivery classification should be made. For example, if the popularity wanes for a video, CDN manager 102 changes the classification from popular to less viewed. If the delivery classification is not changed, then the process reiterates where data for the asset characteristics continue to be monitored. However, if CDN manager 102 changes the delivery classification, then at 708, CDN manager 102 changes the CDN distribution. For example, CDN manager 102 may remove files from CDNs or add files to CDNs for the asset.

Accordingly, particular embodiments dynamically determine and adjust the distribution of files for assets to CDNs. When a service distributes a large number of assets to CDNs, the dynamic distribution and adjustment may provide large cost savings via storage costs for the service while also maintaining a desired performance.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for distributing files for assets to a plurality of content delivery networks (CDNs) for a company providing a video content delivery service, the method comprising:
    determining, by a computing device, a set of asset characteristics related to an asset of video content;
    analyzing, by the computing device, the set of asset characteristics to determine a delivery classification for the asset, wherein different asset characteristics result in different delivery classifications; and
    automatically, by the computing device, determining a set of content delivery networks to distribute files for the asset based on the delivery classification, wherein:
    a first asset with a different delivery classification from a second asset has files delivered by the company to a first set of content delivery networks that are different from a second set of content delivery networks in which files for the second asset are delivered,
    the files delivered by the company to the first set of content delivery networks and second set of content delivery networks are stored by the first set of content delivery networks and second set of content delivery networks for delivery to users in response to the users requesting the first asset or the second asset, and
    the first set of content delivery networks and second set of content delivery networks that deliver the video content for the asset to the users charge the company for the use of each respective content delivery network and also charge for storage of the files.

2. The method of claim 1, wherein the set of CDNs comprises less than all of the plurality of CDNs.

3. The method of claim 1, further comprising:
    re-analyzing the set of asset characteristics to re-evaluate the delivery classification for the asset; and
    if a new delivery classification is determined, dynamically adjusting the set of content delivery networks to distribute files for the asset based on the new delivery classification.

4. The method of claim 1, wherein an asset characteristic in the set of asset characteristics comprises a popularity characteristic describing a popularity of viewing patterns for the asset over time.

5. The method of claim 1, wherein an asset characteristic in the set of asset characteristics comprises a file size characteristic.

6. The method of claim 1, further comprising:
    determining a plurality of models that each have a plurality of delivery classifications, wherein each model distributes files for assets differently; and
    selecting one of the models to use to determine the set of content delivery networks, wherein the respective plurality of delivery classifications are used for the selected one of the models.

7. The method of claim 1, further comprising delivering different file sizes for the asset to different CDNs, the different file sizes representing different bitrates for the asset.

8. The method of claim 4, further comprising dynamically changing the files distributed to the set of content delivery networks as the popularity over time changes.

9. The method of claim 8, wherein dynamically changing the files comprises removing one or more files from a content delivery network in the set of content delivery networks as the popularity over time decreases.

10. The method of claim 8, wherein dynamically changing the files comprises adding one or more files to a new content delivery network as the popularity over time increasing.

11. The method of claim 6, further comprising dynamically changing which model to use to distribute files for multiple assets.

12. A non-transitory computer-readable storage medium containing instructions for distributing files for assets to a plurality of content delivery networks (CDNs) for a company providing a video content delivery service, wherein the instructions, when executed, control a computer system to be configured for:

determining a set of asset characteristics related to an asset of video content;

analyzing the set of asset characteristics to determine a delivery classification for the asset, wherein different asset characteristics result in different delivery classifications; and automatically determining a set of content delivery networks to distribute files for the asset based on the delivery classification, wherein:

a first asset with a different delivery classification from a second asset has files delivered by the company to a first set of content delivery networks that are different from a second set of content delivery networks in which files for the second asset are delivered, the files delivered by the company to the first set of content delivery networks and second set of content delivery networks are stored by the first set of content delivery networks and second set of content delivery networks for delivery to users in response to the users requesting the first asset or the second asset, and the first set of content delivery networks and second set of content delivery networks that deliver the video content for the asset to the users charge the company for the use of each respective content delivery network and also charge for storage of the files.

13. The non-transitory computer-readable storage medium of claim 12, wherein the set of CDNs comprises less than all of the plurality of CDNs.

14. The non-transitory computer-readable storage medium of claim 12, further configured for:

re-analyzing the set of asset characteristics to re-evaluate the delivery classification for the asset; and if a new delivery classification is determined, dynamically adjusting the set of content delivery networks to distribute files for the asset based on the new delivery classification.

15. The non-transitory computer-readable storage medium of claim 12, wherein an asset characteristic in the set of asset characteristics comprises a popularity characteristic describing a popularity of viewing patterns for the asset over time.

16. The non-transitory computer-readable storage medium of claim 12, wherein an asset characteristic in the set of asset characteristics comprises a file size characteristic.

17. The non-transitory computer-readable storage medium of claim 12, further configured for:

determining a plurality of models that each have a plurality of delivery classifications, wherein each model distributes files for assets differently; and selecting one of the models to use to determine the set of content delivery networks, wherein the respective plurality of delivery classifications are used for the selected one of the models.

18. The non-transitory computer-readable storage medium of claim 12, further configured for delivering different file sizes for the asset to different CDNs, the different file sizes representing different bitrates for the asset.

19. The non-transitory computer-readable storage medium of claim 15, further comprising dynamically changing the files distributed to the set of content delivery networks as the popularity over time changes.

20. The non-transitory computer-readable storage medium of claim 19, wherein dynamically changing the files comprises removing one or more files from a content delivery network in the set of content delivery networks as the popularity over time decreases.

21. The non-transitory computer-readable storage medium of claim 19, wherein dynamically changing the files comprises adding one or more files to a new content delivery network as the popularity over time increasing.

22. The non-transitory computer-readable storage medium of claim 17, further configured for dynamically changing which model to use to distribute files for multiple assets.

23. An apparatus configured to distribute files for assets to a plurality of content delivery networks (CDNs) for a company providing a video content delivery service, the apparatus comprising:

one or more computer processors; and a non-transitory computer-readable storage medium comprising instructions, that when executed, control the one or more computer processors to be configured for:

determining a set of asset characteristics related to an asset of video content;

analyzing the set of asset characteristics to determine a delivery classification for the asset, wherein different asset characteristics result in different delivery classifications; and automatically determining a set of content delivery networks to distribute files for the asset based on the delivery classification, wherein:

a first asset with a different delivery classification from a second asset has files delivered by the company to a first set of content delivery networks that are different from a second set of content delivery networks in which files for the second asset are delivered, the files delivered by the company to the first set of content delivery networks and second set of content delivery networks are stored by the first set of content delivery networks and second set of content delivery networks for delivery to users in response to the users requesting the first asset or the second asset, and the first set of content delivery networks and second set of content delivery networks that deliver the video content for the asset to the users charge the company for the use of each respective content delivery network and also charge for storage of the files.

* * * * *